United States Patent
Hirano et al.

[11] Patent Number: 5,343,393
[45] Date of Patent: Aug. 30, 1994

[54] STEERING ANGLE DETECTING APPARATUS FOR MOTOR VEHICLES BASED ON THE PHASE DIFFERENCE BETWEEN A STEERING ANGLE DETECTION SIGNAL AND STEERING ANGLE ESTIMATED SIGNAL

[75] Inventors: Hiroyuki Hirano, Kariya; Yoshihiko Tsuzuki, Toyota; Satoshi Haseda, Okazaki; Akira Fukushima, Kariya; Hideo Inoue, Ashigarakami; Osamu Takeda, Susono, all of Japan

[73] Assignee: Nippondenso Co., Ltd., Kariya, Japan

[21] Appl. No.: 710,179

[22] Filed: Jun. 4, 1991

[30] Foreign Application Priority Data

Jun. 4, 1990 [JP] Japan .................. 2-146417

[51] Int. Cl.$^5$ .................. G06F 15/50; B62D 6/00; B62D 15/02
[52] U.S. Cl. .................. 364/424.05; 364/424.01; 180/142
[58] Field of Search .................. 364/424.05, 424.01, 364/569, 559; 180/140, 141, 142, 143, 79.1; 280/91; 73/1 E

[56] References Cited

U.S. PATENT DOCUMENTS

| | | | |
|---|---|---|---|
| 4,794,536 | 12/1988 | Eto et al. | 364/424.05 |
| 4,828,061 | 5/1989 | Kimbrough et al. | 180/79.1 |
| 4,834,203 | 5/1989 | Takahashi et al. | 364/424.01 X |
| 5,001,636 | 3/1991 | Shiraishi et al. | 364/424.05 |
| 5,001,637 | 3/1991 | Shiraishi et al. | 364/424.05 |

FOREIGN PATENT DOCUMENTS

| | | |
|---|---|---|
| 0282041 | 9/1988 | European Pat. Off. |
| 0353995 | 2/1990 | European Pat. Off. |
| 63-218866 | 9/1988 | Japan |
| 63-219828 | 9/1988 | Japan |
| 63-219829 | 9/1988 | Japan |
| 194029 | 4/1989 | Japan |
| 194030 | 4/1989 | Japan |
| 194031 | 4/1989 | Japan |
| 240504 | 2/1990 | Japan |
| 241979 | 2/1990 | Japan |

*Primary Examiner*—Jack B. Harvey
*Assistant Examiner*—Melanie Kemper
*Attorney, Agent, or Firm*—Cushman, Darby & Cushman

[57] ABSTRACT

A steering angle detecting apparatus for accurately and surely detecting a steering angle of a motor vehicle. The apparatus is equipped with a turning angle detector for detecting a turning angle of a steering wheel of the motor vehicle. In addition, the apparatus estimates a turning angle of the steering wheel on the basis of the difference in speed between left and right wheels of the motor vehicle so as to calculate the difference in phase between the detection turning angle and the estimation turning angle. For detecting the accurate vehicle steering angle, the detection turning angle is corrected on the basis of the calculated phase difference therebetween.

13 Claims, 8 Drawing Sheets

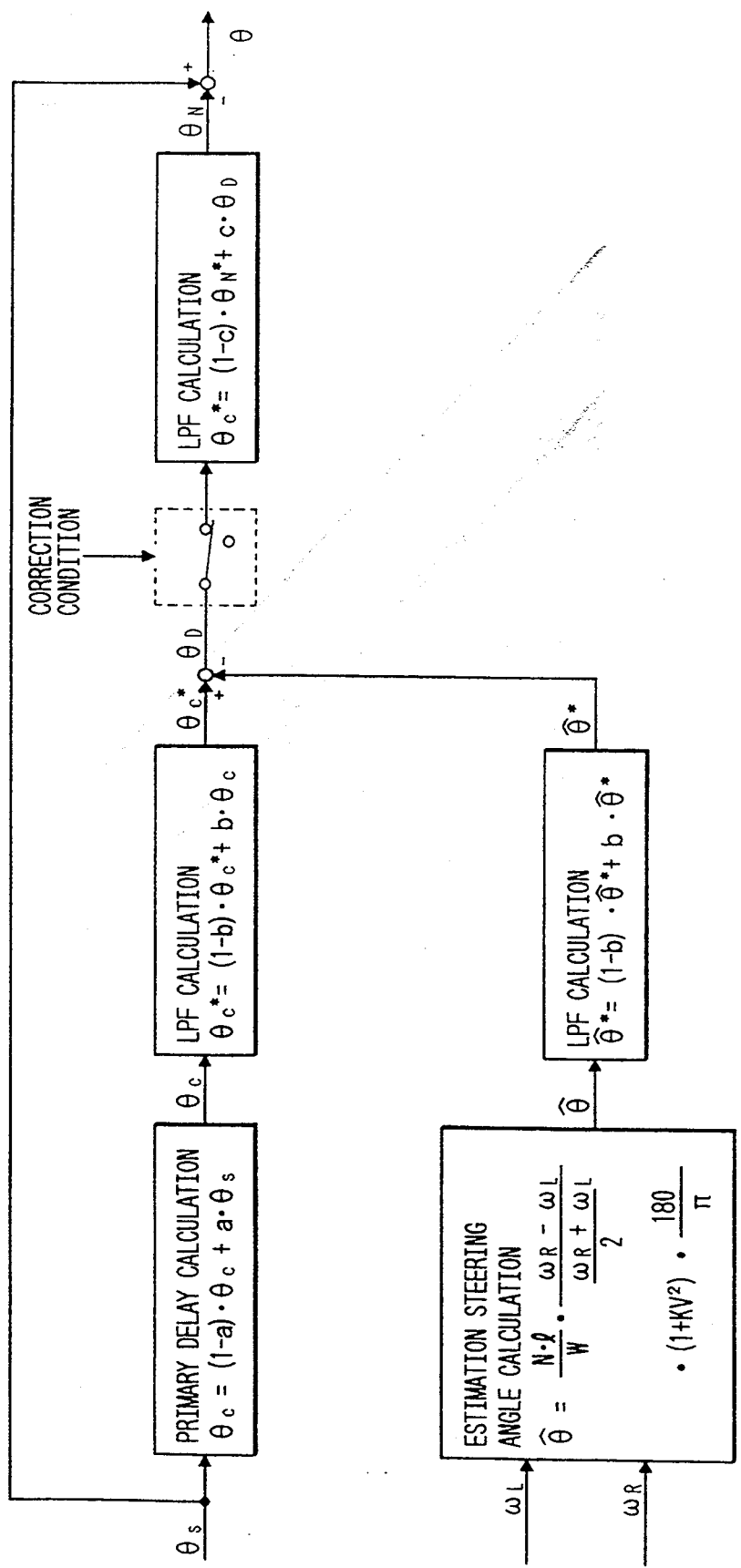

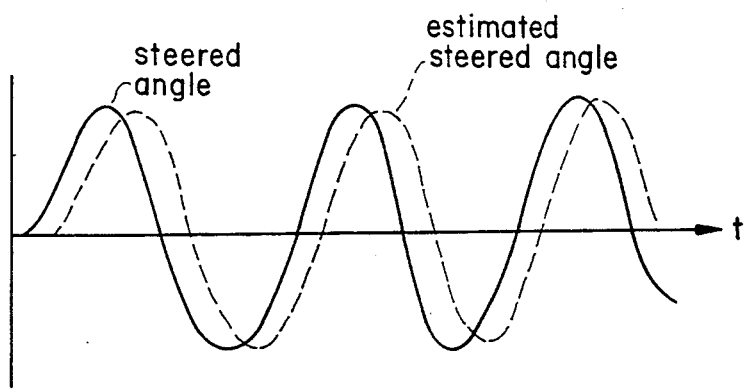
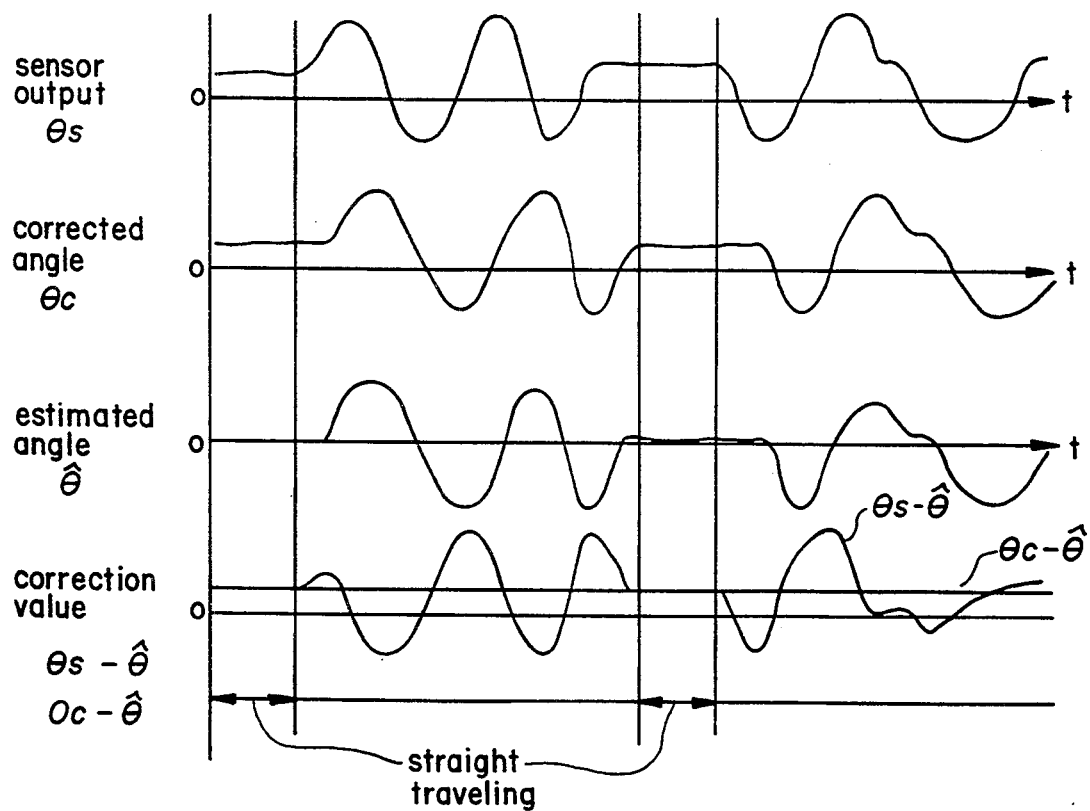

STEERING ANGLE DETECTING APPARATUS FOR MOTOR VEHICLES BASED ON THE PHASE DIFFERENCE BETWEEN A STEERING ANGLE DETECTION SIGNAL AND STEERING ANGLE ESTIMATED SIGNAL

BACKGROUND OF THE INVENTION

The present invention relates to a steering angle (steering-wheel turning angle) detecting apparatus for use in motor vehicles.

Generally, for detecting a steering angle of a motor vehicle due to operation of a steering wheel, a rotary encoder is attached to a steering shaft so as to output two-phase pulse signals which are in turn up-and-down-counted and sampled to calculate the absolute value of the steering angle. The calculation of the absolute value of the steering angle can be determined on the basis of the count value of the two-phase pulse signals when the motor vehicle is straightforwardly running, i.e., when the steering wheel is taking the neutral position. However, one of problems with such a steering angle detecting arrangement is that it is difficult to detect the neutral position of the steering wheel because the steering wheel allows about three revolutions. In addition, the neutral position of the steering wheel must be detected at least one time after the turning-on of a keyswitch of the motor vehicle. This is because the neutral position (or count value) can be shifted when the keyswitch is turned on due to the movement of the steering wheel after the keyswitch had been turned off. One possible solution for this problem is to detect the neutral position on the basis of the average value of the steering angle signals obtained when the steering neutral zone signal is detected such as disclosed in the Japanese Patent Provisional Publication No. 61-28811. Another possible solution is to correct and update the neutral position by increasingly changing the weight of the steering angle position as the motor vehicle more takes the straight-running state. There are problems which arise with such techniques, however, in that the neutral position can be obtained only in a limited steering angle range and difficulty is encountered to accurately obtain the steering angle neutral position when the motor vehicle is out of this limited range (a.k.a. turning).

SUMMARY OF THE INVENTION

It is therefore an object of the present invention to provide a steering angle detecting apparatus which is capable of accurately detecting the steering angle not only when the motor vehicle is straightforwardly running but also when the steering wheel turning angle is changing.

In accordance with the present invention, there is provided a steering angle detecting apparatus for a motor vehicle, comprising: turning angle detecting means attached to a steering wheel of the motor vehicle for detecting a turning angle of the steering wheel and outputting a signal indicative of the detected steering-wheel turning angle; speed difference detecting means for detecting a difference in speed between left and right wheels of the motor vehicle and for outputting a signal indicative of the detected speed difference therebetween; estimation means for estimating a steering wheel turning angle on the basis of the speed difference signal from the speed difference detecting means and outputting a signal representative of the estimated steering wheel turning angle; first correction means for correcting a phase difference between the turning angle signal outputted from the turning angle detecting means and the estimation turning angle signal outputted from the estimation means; and second correction means for correcting the turning angle detected by the turning angle detecting means, on the basis of the detection turning angle signal and estimation turning angle signal in which the phase difference therebetween is corrected by said first correction means.

Preferably, the first correction means corrects the phase of the detection turning angle by a delay element. The second correction means includes first filter means to perform a low-pass filter process with respect to the estimation turning angle and the detection turning angle, where the phase difference is corrected by the first correction means. The second correction means comprises calculation means for calculating a difference between the estimation turning angle and the detection turning angle, where the low-pass filter process is effected and means for correcting the detection turning angle on the basis of the difference calculated by said calculation means. More preferably, the second correction means comprises second filter means for performing a low-pass filter process with respect to the difference calculated by the calculation means and further comprises allowance means for allowing the filter process of the second filter means to operate with respect to the calculated difference when a running state of said motor vehicle is under a predetermined condition.

BRIEF DESCRIPTION OF THE DRAWINGS

The object and features of the present invention will become more readily apparent from the following detailed description of the preferred embodiments taken in conjunction with the accompanying drawings in which:

FIG. 7 is a block diagram for describing the control of this embodiment;

FIG. 12 is an illustration of a possible phase difference between the detected steering angle signal and the estimated steering angle signal; and FIG. 13 is an example of the operation of the first correction means.

DETAILED DESCRIPTION OF THE INVENTION

Figure 1:
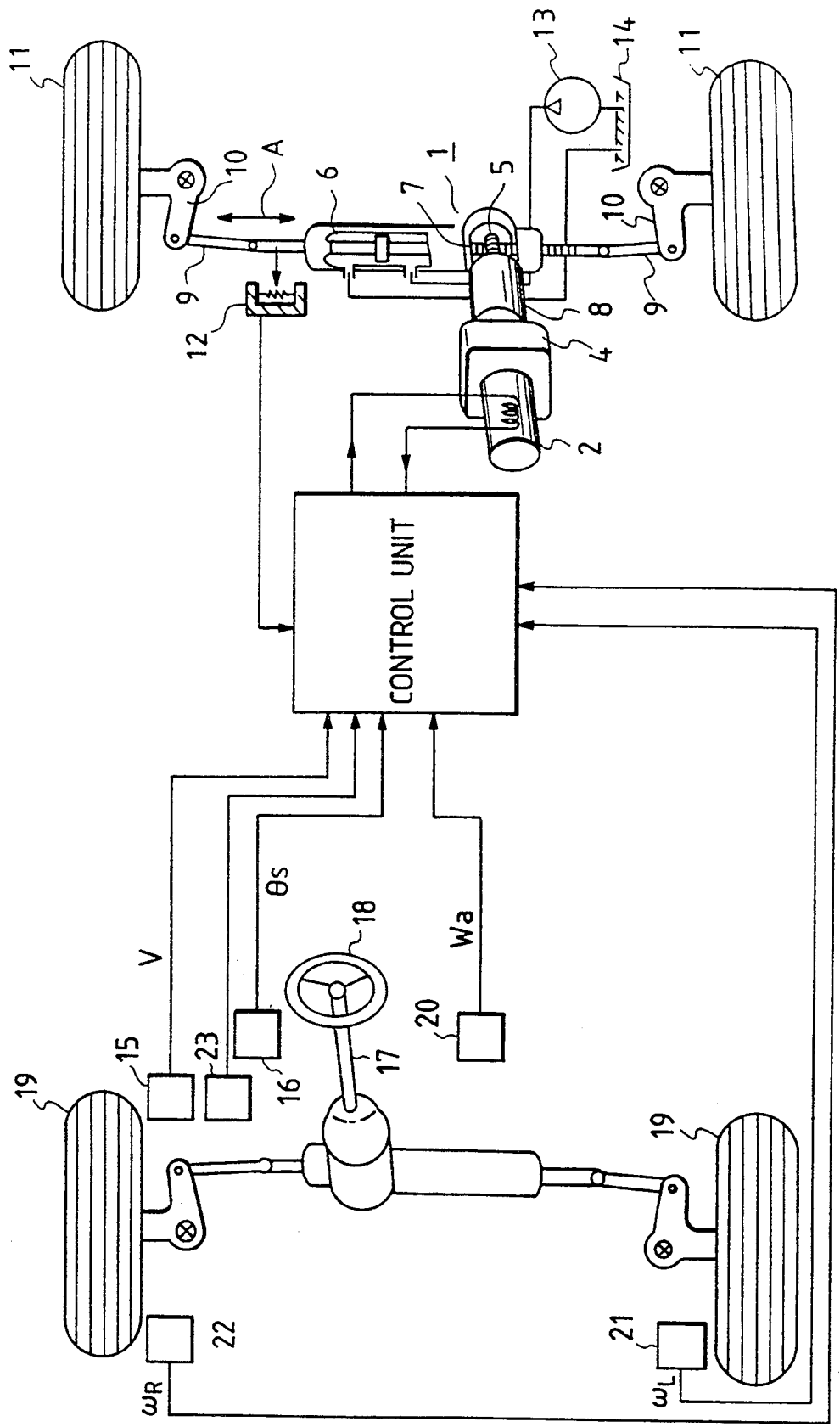
FIG. 1 is an illustration of a rear-wheel steering control system into which an embodiment of this invention is incorporated.

Referring now to FIG. 1, there is illustrated a rear-wheel steering apparatus into which an embodiment of this invention is incorporated. In FIG. 1, illustrated at numeral 1 is a rear-wheel steering mechanism equipped with a direct-current (dc) servo motor 2 which is reversibly rotatable in response to an electric command signal from an electric control unit 3. The dc servo motor 2 is coupled through a reduction gear 4 to a rack and pinion mechanism with a hydraulic pressure power asist, i.e., an input shaft (torsion bar, not shown) of the aforementioned steering mechanism 1. To the other end of the torsion bar there is attached a pinion gear 5 which is engaged with a rack 7 formed at one end portion of a power piston 6. More specifically, one end portion of the torsion bar is rotated by means of the motor 2 so as to be twisted whereby the aperture area of a hydraulic pressure valve 8 varies so as to supply the hydraulic pressure to restore the twisted state of the torsion bar to thereby move the power piston 6. Both ends of the power piston 6 are respectively coupled through tie rods 9 to steering knuckle arms 10. The rear wheels 11 are supported by the steering knuckle arms 10 so as to be slidably movable in the right and left directions. Accordingly, in response to the movement of the power piston 6 in the directions indicated by arrows A in the illustration, the rear wheels 11 are respectively steered in the right and left directions. Further, when the twisted state of the torsion bar is restored, the aperture area of the hydraulic pressure valve 8 becomes zero so that the hydraulic pressure for operating the power piston 6 also becomes zero to stop of the movement of the power piston 6.

Here, a rear-wheel steering angle sensor illustrated at numeral 12 detects the position of the power piston 6 to output a detection signal representative of the position thereof. Further, on the basis of this detection signal, the electric control unit 3 obtains the rear-wheel real steering angle in accordance with the relation between the position of the power piston 6 and the rear-wheel real steering angle and further obtains a steering angular velocity on the basis of the rate of change of the obtained rear-wheel real steering angles. The control unit 3 and the steering mechanism 1 including the servo motor 2 make up a positioning servo system which controls the position of the rear wheels 11 so that the rear-wheel steering angle command position is coincident with the rear-wheel real steering angle. In FIG. 1, numeral 13 represents a hydraulic pressure pump for supplying a hydraulic pressure through the hydraulic pressure valve 8 to the power piston 6 and numeral 14 designates an oil tank.

A vehicle speed sensor 15 is for detecting the rotational speed of the wheel or wheel shaft so as to output a vehicle speed signal indicative of a vehicle speed V to the control unit 3, and a front-wheel steering angle sensor 16, being composed of an increment type rotary encoder, is provided with respect to a steering shaft 17 which is a body to be rotated. The front-wheel steering angle sensor 16 is arranged to detect the rotation of the steering shaft 17 due to the operation of a steering wheel 18 so as to output a front-wheel steering angle signal indicative of the steering angle $\theta s$ of the front wheels 19 to the control unit 3. Illustrated at numeral 20 is a yaw rate sensor which is composed of a gyro or the like so as to output to the control unit 3 a yaw rate signal corresponding to a turning angular velocity (yaw rate Wa) of the motor vehicle with respect to the center of gravity of the motor vehicle. A left-wheel speed sensor 21 detects a rotational speed $\omega_L$ of the front-left wheel 19 and a right-wheel speed sensor 22 detects a rotational speed $\omega_R$ of the front-right wheel 19. A brake switch 23 is arranged to turn on when an anti-lock braking system (ABS) is in operation or when the braking pedal is in the operated state.

Figure 2:
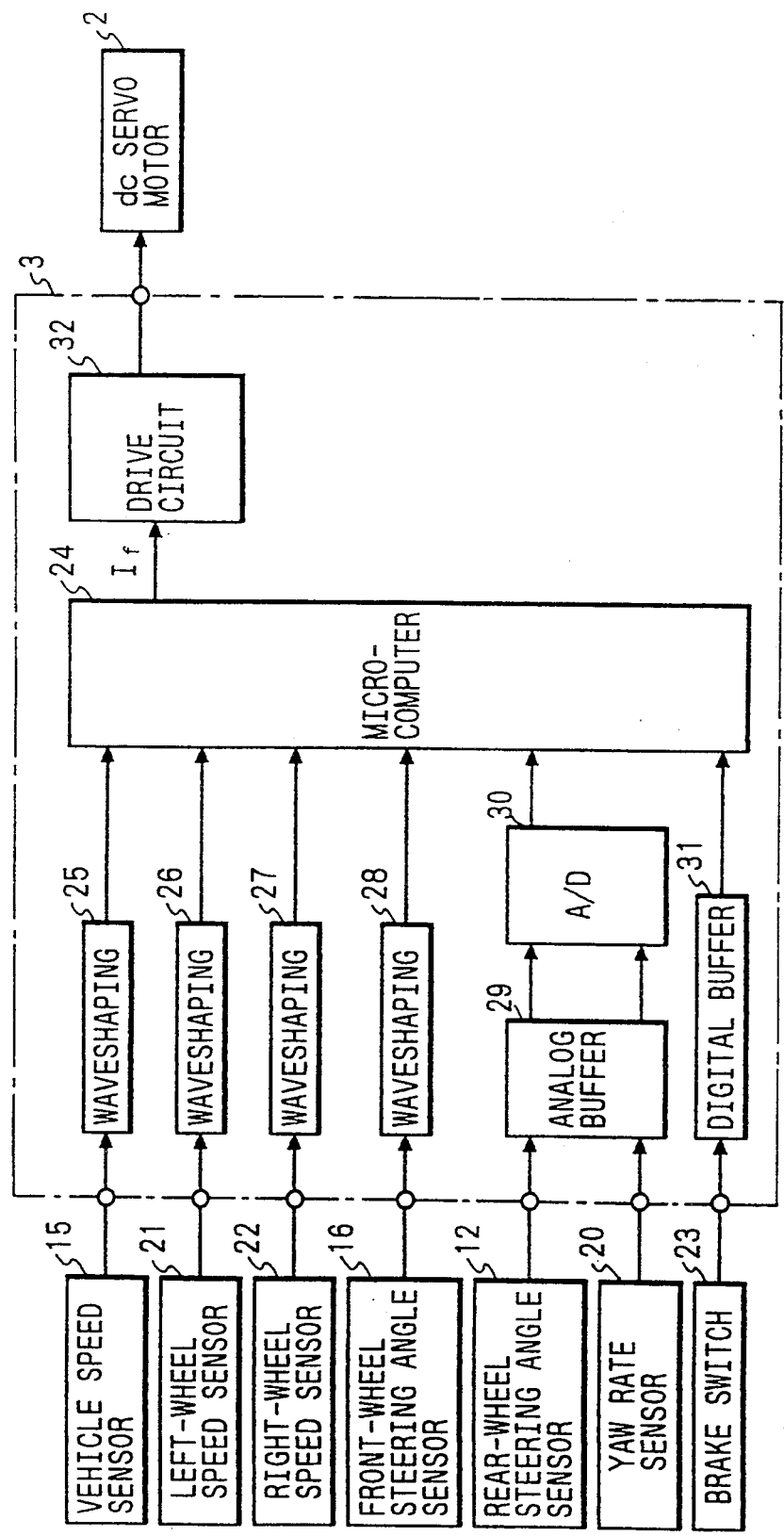
FIG. 2 is a block diagram showing an electric arrangement of a control unit of the steering control system illustrated in FIG. 1.

The control unit 3 will be described hereinbelow with reference to FIG. 2. The control unit 3 comprises a microcomputer 24 including a central processing unit (CPU) and associated units such as a RAM and ROM, waveform shaping circuits 25 to 28, an analog buffer 29, an analog-to-digital (A/D) converter 30, a digital buffer 31 and a drive circuit 32. The waveform shaping circuits 25 to 28 are respectively responsive to the signals from the vehicle speed sensor 15, left-wheel speed sensor 21, right-wheel speed sensor 22 and front-wheel steering angle sensor 16 for waveform-shaping and outputting the input signals to the microcomputer 24. Further, the analog buffer 29 is coupled to the output signals of the rear-wheel steering angle sensor 12 and yaw rate sensor 20 and the A/D converter 30 performs the analog-to-digital conversion of the output signals thereof. The digital buffer 31 latches the output signal of the brake switch 23 and the drive circuit supplies the dc servo motor 2 with a current corresponding to the current command value signal If from the microcomputer 24.

Figure 3:
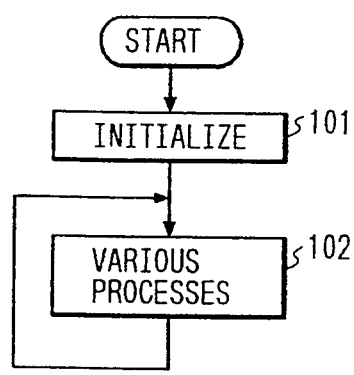
FIGS. 3 to 6 are flow charts for describing the operation to be executed in the embodiment.
Figure 4:
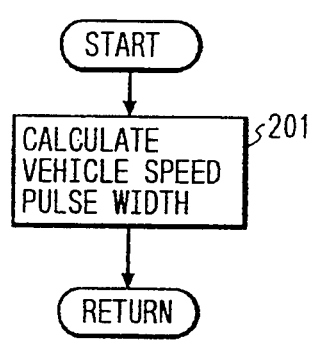
Figure 5:
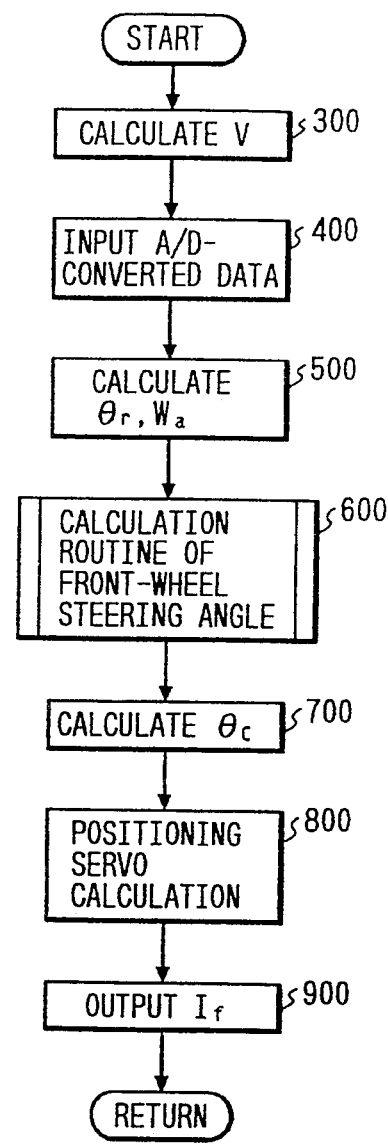

The operation of the rear-wheel steering angle control system thus arranged will be described hereinbelow with reference to flow charts of FIGS. 3 to 5. FIG. 3 shows a main process routine, FIG. 4 illustrates a vehicle speed pulse process based on the pulse signal from the vehicle speed sensor 15, and FIG. 5 illustrates an interrupt routine to be executed at a predetermined time interval (for example, every 5 ms). As illustrated in FIG. 3, the microcomputer 24 performs the initialization with a step 101 at the time of the start and then repeatedly executes various processes with a subsequent step 102. In addition, as illustrated in FIG. 4, the microcomputer 24 executes a step 201 so as to calculate the vehicle speed pulse width on the basis of the difference between the previous pulse interrupt generation time and the present pulse interrupt generation time and store the calculation result. Moreover, as illustrated in FIG. 5, the microcomputer 24 first executes a step 300 in order to calculate the vehicle speed on the basis of the vehicle speed pulse width stored in the vehicle speed pulse interrupt process. Similarly, the left- and right-wheel speeds $\omega_L$ and $\omega_R$ of the front wheels 19 are respectively calculated on the basis of the wheel speed pulse widths to be obtained from the output signals of the left-wheel speed sensor 21 and the right-wheel speed sensor 22. Here, although in this embodiment the vehicle speed V is arranged to be obtained through the vehicle speed sensor 15, it is appropriate to obtain the vehicle speed V in accordance with the equation $(\omega_L + \omega_R)/2$.

Figure 6:
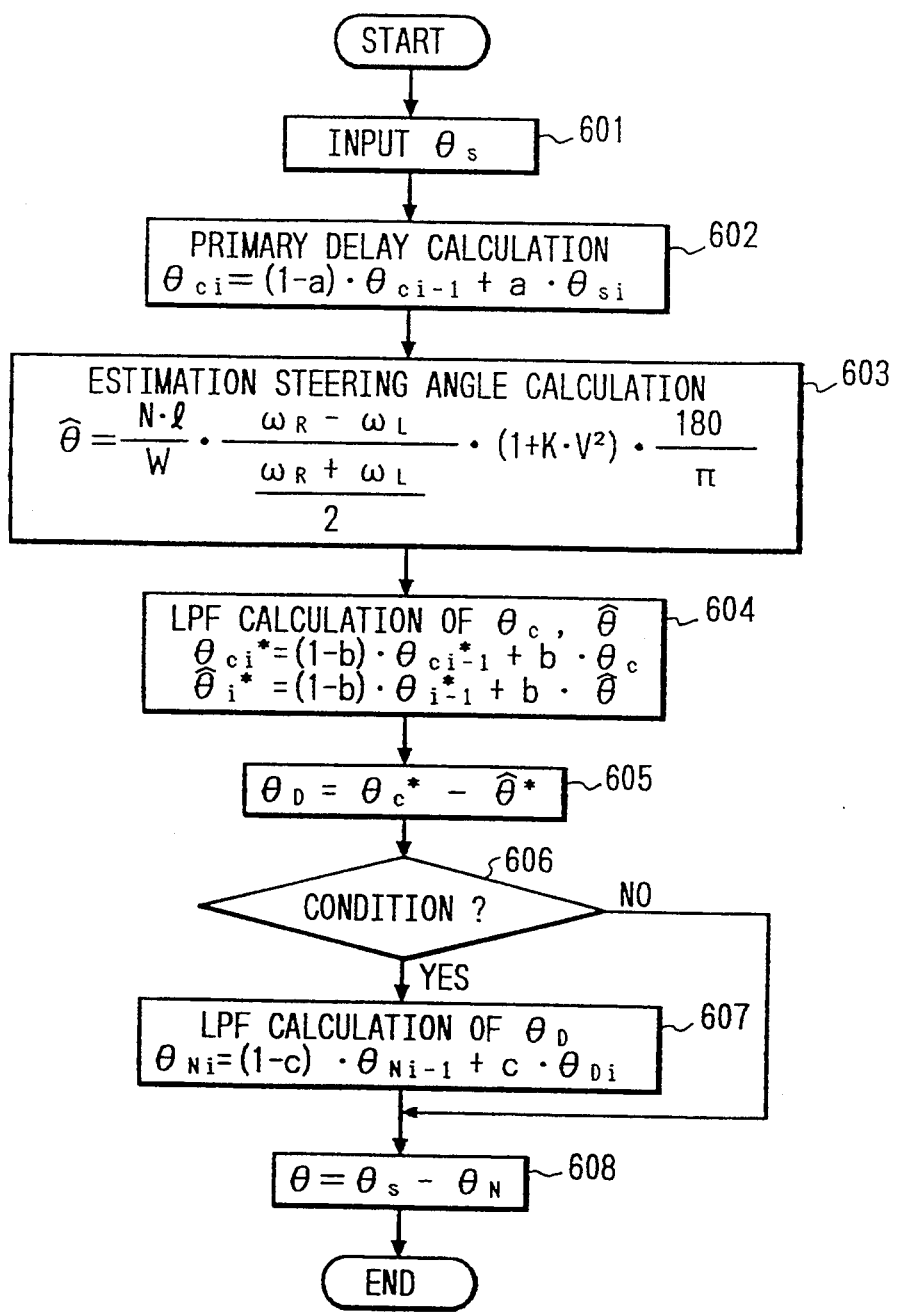

Thereafter, the microcomputer 24 executes a step 400 so as to receive the A/D conversion data from the A/D converter 30 which are obtained from the output signals of the rear-wheel steering angle sensor 12 and the yaw rate sensor 20 and then executes a step 500 to calculate the rear-wheel real steering angle $\theta r$ and the real yaw rate Wa on the basis of the A/D conversion data therefrom. Further, the microcomputer 24 executes a step 600 for a routine to calculate the front-wheel steering angle (steering wheel turning angle) $\theta s$. This front-wheel steering angle calculation routine is effected as illustrated in FIG. 6. FIG. 7 is a control block diagram for the front-wheel steering angle calculation routine illustrated in FIG. 6. In FIG. 6, the microcomputer 24 first executes a step 601 to input the steering angle $\theta s$ read out from the front-wheel steering angle sensor 16, then followed by a step 602 to calculate the steering angle $\theta c$ using the primary delay (lag) transfer characteristic. That is, the steering angle $\theta c$ can be calculated in accordance with the following equation:

$$\theta c_i = (1-a) \cdot \theta c_{i-1} + a \cdot \theta s_i$$

where a represents a constant to be calculated on the basis of the time constant, i designates the present value, and i −1 denotes the previous value.

Furthermore, the microcomputer 24 executes a step 603 to calculate an estimation steering angle $\theta$ on the basis of the left-wheel speed $\omega_L$ due to the left-wheel speed sensor 21 and the right-wheel speed $\omega_R$ due to the right-wheel sensor 22 in accordance with the following equation:

$$\theta = \frac{N \cdot l}{W} \cdot \frac{\omega_R - \omega_L}{\frac{\omega_R + \omega_L}{2}} \cdot (1 + K \cdot V^2) \cdot \frac{180}{\pi} \quad (1)$$

where, N represents a steering gear ratio, l designates a wheel base, W depicts a tread, V denotes a vehicle speed, and K is a stability factor indicating the under-steer or over-steer characteristic of the motor vehicle.

Figure 9:
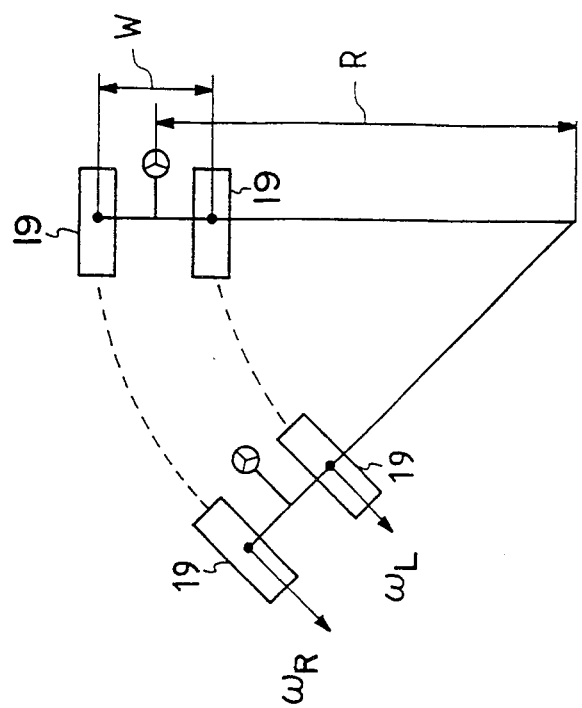
FIGS. 8 and 9 are illustrations for describing the steering states of a motor vehicle.
Figure 8:
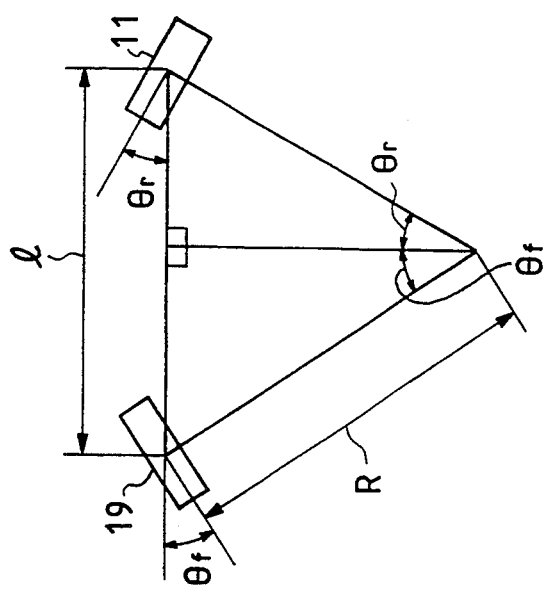

Here, as seen from in FIG. 8, the front-wheel steering angle $\theta f$ becomes as follows:

$$\theta f = l/R - \theta r \quad (2)$$

and, as seen from FIG. 9, the turning radius R becomes as follows:

$$R = \frac{\frac{\omega_R + \omega_L}{2}}{\omega_R - \omega_L} \cdot W \quad (3)$$

Thus, the above-mentioned equation (1) can be deduced from the aforementioned equations (2) and (3). However, the equation (1) is made under the condition of $\theta f >> \theta r$ which disregards the influence of the rear-wheel steering operation.

Moreover, the microcomputer 24 thereafter executes a step 604 to perform the low-pass filter process for $\theta c$ and $\hat{\theta}$. That is, the estimation steering angle $\hat{\theta}^*$ and the steering angle $\theta c^*$ due to the front-wheel steering angle sensor 16 are obtained in accordance with the following processes:

$$\theta c^*_i = (1-b) \cdot \theta c^*_{i-1} + b \cdot \theta c_i$$

$$\hat{\theta}^*_i = (1-b) \cdot \hat{\theta}^*_{i-1} + b \cdot \theta_i$$

where b represents a constant to be calculated on the basis of the time constant.

Thereafter, in a step 605 the microcomputer 24 calculates as the neutral position $\theta D$ the difference ($\theta c^* - \hat{\theta}^*$) between the estimation steering angle $\hat{\theta}^*$ and the steering angle $\theta c^*$, then followed by a step 606 in order to decide whether the correction condition is satisfied. This satisfaction of the correction condition means that the vehicle driving characteristic and driving state satisfying the above-mentioned primary delay are linear and are in regions for allowing equations. That is, for example, the correction condition can be satisfied when the absolute value of the estimation steering angle $\hat{\theta}^*$ is below a predetermined value $\theta_{MAX}$, the vehicle speed V is in a range from a predetermined value $V_{LOW}$ to a predetermined value $V_{HIGH}$ and the motor vehicle is not in the brake-operating state due to the brake switch 23 (the motor vehicle is not under the anti-brake-lock system control- In response to the satisfaction of this correction condition, the microcomputer 24 executes a step 607 in order to perform the low-pass filter process of the neutral position $\theta D$ to calculate the final neutral position $\theta N$ That is, the following process is effected:

$$\theta N_i = (1-c) \cdot \theta N_{i-1} + c \cdot \theta D_i$$

where c represents a filter constant, i designates the present value and i−1 depicts the previous value.

This low-pass filter process is for removing noises to be introduced into the wheel speed.

Thereafter, the microcomputer 24 executes a step 608 to set as the final steering angle $\theta$ the difference ($\theta s - \theta N$) between the steering angle $\theta s$ due to the front-wheel steering angle sensor 16 and the final neutral position $\theta N$. On the other hand, if in the step 606 the answer is negative (no satisfaction of the correction condition), the microcomputer 24 does not execute the process of the step 607.

Returning again to FIG. 5, the microcomputer 24 executes a step 700 in order to calculate the rear-wheel steering angle command position $\theta c$. That is, the target yaw rate Ws is calculated on the basis of the vehicle speed V and the final front-wheel steering angle $\theta$ in accordance with the following equation:

$$Ws = \frac{V}{1 + K \cdot V^2} \cdot \frac{1}{l \cdot N} \cdot \theta$$

where K represents a stability factor, l denotes the wheel base of the motor vehicle and N depicts the steering ratio.

After this calculation, the microcomputer further calculates the difference $\Delta W$ ($=Wa-Ws$) between the real yaw rate Wa and the target yaw rate Ws so as to obtain the rear-wheel steering angle command position $\theta c$ in accordance with the following functional expression:

$$\theta c = F(\Delta W, V)$$

here, $F(\Delta W, V)$ indicates the condition that the yaw rate difference $\Delta W$ and the vehicle speed V are parameters.

The microcomputer then executes a step 800 to perform a well known rear-wheel positioning servo calculation on the basis of the rear-wheel steering angle command position $\theta c$ and the rear-wheel real steering angle $\theta r$ so that the difference therebetween becomes zero and then executes a step 900 to calculate the current command value signal If on the basis of the positioning calculation result so that the signal If is outputted to the drive circuit 32 to drive the servo motor 2.

Thus, according to this embodiment, the microcomputer 24 calculates the estimation steering angle $\theta$ on the basis of the left-wheel speed $\omega_L$ due to the left-wheel speed sensor 21 and the right-wheel speed $\omega_R$ due to the right-wheel speed sensor 22, and further calculates the neutral position of the steering angle on the basis of the estimation steering angle $\theta$ using the primary delay transfer characteristic of the signal from the front-wheel steering angle sensor (rotary encoder) 16. That i s, in response to the operation of the steering wheel of the motor vehicle, a lateral force is generated with respect to the wheel and a moment is generated with respect to the motor vehicle, thereby making the difference between the speeds of the left and right wheels. In these operations, although the generation of the speed difference between the left and right wheels can be delayed with respect to the operation of the steering wheel, this is approximated through the primary delay transfer characteristic. As a result, it is possible to accurately calculate the neutral position of the steering angle even if the motor vehicle is in the turning state. In addition, since the calculation of the estimation steering angle $\theta$ is performed with the stability factor K being used as an element, the estimation steering angle can be calculated with a higher accuracy.

It should be noted that a detecting mechanism inputs $\theta_s$ via the front wheel steering angle sensor as shown in step 601 of FIG. 6. The first correcting mechanism then performs a primary delay calculation as shown in step 602. Next, the steering angle is estimated via the estimation mechanism step 603, and finally, steps 604–608 correspond to the operation of the second correction means.

Here, this invention is not limited to the above-described embodiment. For instance, although in the step 602 of FIG. 6 the steering angle $\theta c$ is calculated using the primary delay transfer characteristic, it is also appropriate that the lag of the generation of the speed difference between the front left and right wheels 19 with respect to the operation of the steering wheel is approximated with a N-order transfer characteristic (N is an integer equal to or greater than 2). At this time, if using a second-order transfer characteristic, it is possible to reduce the estimation error of the difference in phase between the steering wheel turning angle and the estimation steering angle. In addition, for the calculation of the estimation steering angle, it is appropriate to use as an element the turning angle $\theta r$ of the rear wheel 11 in accordance with the following equation:

$$\theta = \left( \frac{N \cdot l}{W} \cdot \frac{\omega_R - \omega_L}{\frac{\omega_R + \omega_L}{2}} \cdot \frac{180}{\pi} - N \cdot \theta r \right) \cdot (1 + K \cdot V^2)$$

Moreover, if adding in the step 606 of FIG. 6 the condition that the correction is performed in the case that the steering wheel angular velocity is below a predetermined value (i.e., adding the decision of $|\theta s| \leq \theta_{MAX}$), it is possible to reduce the estimation error of the difference in phase between the steering wheel turning angle and the estimation steering angle to further heighten the accuracy of the neutral position calculation.

In addition, the neutral position of the steering wheel turning angle is calculated in accordance with the above-described procedure so as to perform the rear-wheel control using the steering wheel turning angle $\theta$ after the neutral position correction on the basis of the steering wheel angle sensor value, while the rear-wheel control is stopped until the ignition key of the motor vehicle is turned on so that the neutral position of the steering wheel turning angle is first calculated and then started using the steering wheel turning angle $\theta$ after the neutral position correction from the timing that the neutral position is first calculated and established. However, in this case, the rear wheels are rapidly steered when the motor vehicle is in the turning state, thereby getting into a danger. Therefore, for a predetermined time period after the neutral position is first calculated, the calculated rear-wheel command value is multiplied by a constant changing from "0" to "1" in accordance with elapse of a predetermined time period so as to obtain a temporary rear-wheel command value, thereby preventing the rapid steering operation of the rear wheels. It is also appropriate to detect the straight running state of the motor vehicle to start the rear wheel control from the straight running state.

Figure 10:
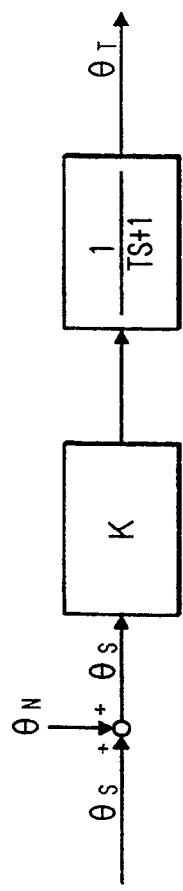
FIGS. 10 and 11 are illustrations for describing different control blocks.

Further, although in the above-described embodiment the neutral position $\theta N$ of the steering angle is calculated with the stability factor K and the time constant T of the primary delay transfer function $(1/(Ts+1))$ being fixed, it is appropriate to calculate the neutral position $\theta N$ with the time constant T and the stability factor K being variables. A detailed arrangement for this case will be described hereinbelow. FIG. 10 shows a model of a motor vehicle. In FIG. 10, the difference $\theta s$ between the steering angle $\theta s$ and the neutral position $\theta N$ is amplified by the stability factor K (gain), and the estimation steering angle $\theta_T$ is approximated using the primary delay transfer function $(1/(Ts+1))$ (s is a Laplacean). In this case, the discretization can be performed as follows.

$$\theta_T = \frac{K}{Ts+1} \cdot \theta s \rightarrow T\dot{\theta}_T = K\theta s - \theta_T$$

$$\therefore \dot{\theta}_T = \frac{K\theta s - \theta_T}{T}$$

$$\theta_i = \theta_{i-1} + T_o \cdot \dot{\theta}_{i-1} \quad (4)$$

$$= \left(1 - \frac{T_o}{T}\right) \cdot \theta_{i-1} + \frac{K T_o}{T} \cdot \theta s_{i-1}$$

$$= \left(1 - \frac{T_o}{T}\right) \cdot \theta_{i-1} + \frac{K T_o}{T} \cdot \theta s_{i-1} + \frac{K T_o}{T} \cdot \theta N$$

$$= a \cdot \theta_{i-1} + b \cdot \theta s_{i-1} + c$$

where To represents the sampling period. These $\underline{a}$, $\underline{b}$ and $\underline{c}$ are estimated through the method of least square so as to calculate T, K and $\theta N$.

Figure 11:
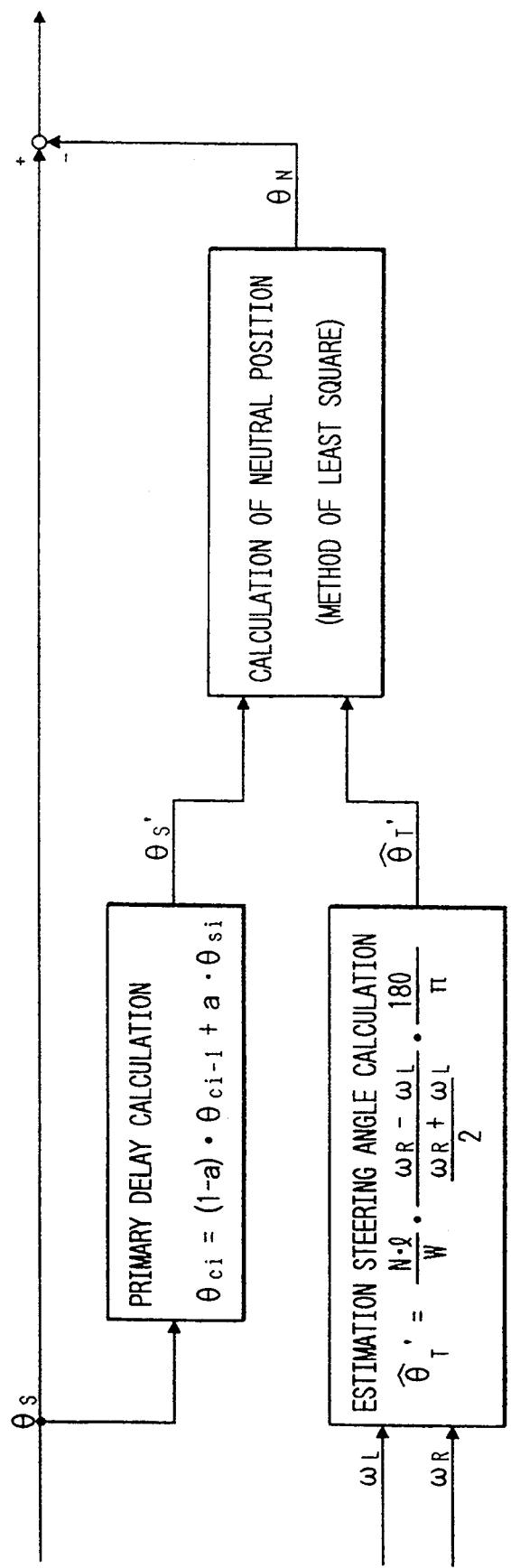

That is, as illustrated in FIG. 11, the estimation steering angle $\theta T$ is calculated on the basis of the left-wheel speed $\omega_L$ due to the left-wheel speed sensor 21 and the right-wheel speed $\omega_R$ due to the right-wheel speed sensor 22 in accordance with the following equation.

$$\theta T = \frac{N \cdot l}{W} \cdot \frac{\omega_R - \omega_L}{\frac{\omega_R + \omega_L}{2}} \cdot \frac{180}{\pi}$$

Thereafter, $\underline{a}$, $\underline{b}$ and $\underline{c}$ in the equation (4) are obtained through the method of least square according to the sequential estimation method so as to calculate T, K and $\theta N$.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A steering angle detecting apparatus for a motor vehicle, comprising:
   turning angle detecting means for detecting a phase of a turning angle of said steering wheel and for outputting a signal indicative of the detected steering wheel turning angle;
   speed difference detecting means for detecting a difference in speed between left and right wheels of said motor vehicle and for outputting a signal indicative of the detected speed difference therebetween;

estimation means for estimating a steering wheel turning angle on the basis of the speed difference signal from said speed difference detecting means and for outputting a signal representative of the estimated steering wheel turning angle;

first correction means, responsive to the signals from said turning angle detecting means and said estimation means, for correcting the phase of the turning angle detected by said turning angle detecting means to compensate for a phase difference between the turning angle signal outputted from said turning angle detecting means and the estimation turning angle signal outputted from said estimation means; and second correction means for correcting the turning angle detected by said turning angle detecting means on the basis of the turning angle corrected in phase by said first correction means and the turning angle estimated by said estimation means.

2. A detecting apparatus as claimed in claim 1, wherein said first correction means includes a delay element to correct the phase output by the turning angle detecting means.

3. A detecting apparatus as claimed in claim 1, wherein said second correction means includes a first filter means to low-pass filter both a signal which corresponds to the turning angle corrected in phase by said first correction means, and a signal which correspond to the turning angle estimated by said estimation means.

4. A detecting apparatus as claimed in claim 3, wherein said second correction means comprises calculation means for calculating a difference between the turning angle estimated by the estimating means and the turning angle detected by the turning angle detecting means, where the low-pass filter process is effected as a means for correcting the detection turning angle on the basis of the difference calculated by said calculation means.

5. A detecting apparatus as claimed in claim 4, wherein said second correction means comprises second filter means for performing a low-pass filter process with respect to the difference calculated by said calculation means.

6. A detecting apparatus as claimed in claim 5, wherein said second correction means comprises allowance means for allowing the filter process of said second filter means with respect to the calculated difference when a running state of said motor vehicle is under a predetermined condition.

7. A detecting apparatus as claimed in claim 6, wherein said predetermined condition represents that the absolute value of the estimation turning angle is below a predetermined value and a speed of said motor vehicle is in a predetermined range.

8. A detecting apparatus as claimed in claim 1, wherein said turning angle detecting means includes an increment type rotary encoder front wheel steering assembly.

9. A steering angle detecting apparatus for determining an angle of a steering wheel of a motor vehicle comprising:

means for detecting an angle corresponding to the steering wheel;

means for estimating an angle corresponding to the steering wheel based on turning conditions of the vehicle;

means for correcting a phase difference between the angle detected by said detecting means and the angle estimated by said estimating means, where said phase difference is caused by a time lag between a steering operation of the steering wheel and a reaction time corresponding to when the vehicle begins to turn; and means for determining a neutral angular position of the steering wheel based on the angle corrected by said correcting means and the angle estimated by said estimating means.

10. A steering angle detecting apparatus as set forth in claim 9, wherein said estimating means estimates the angle of the steering wheel based on the turning conditions, the turning conditions being determined from a difference in speed between right and left wheels of the motor vehicle.

11. A steering angle detecting means as set forth in claim 9, wherein said correcting means corrects a phase of the angle detected by said detecting means to compensate the phase difference.

12. A steering angle detecting means as set forth in claim 9, wherein said correcting means uses a primary delay element to correct a phase of the angle detected by said detecting means.

13. A steering angle detecting means as set forth in claim 9, wherein said detecting means includes an increment type rotary encoder front wheel steering assembly.

* * * * *